Figure 7:
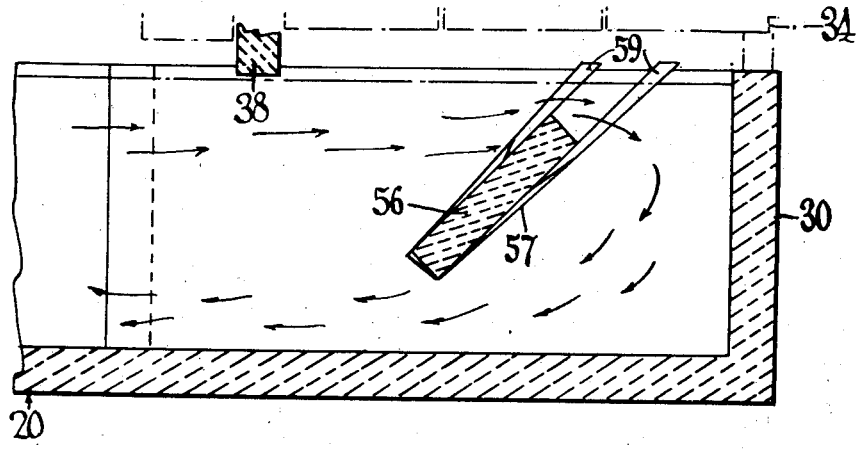

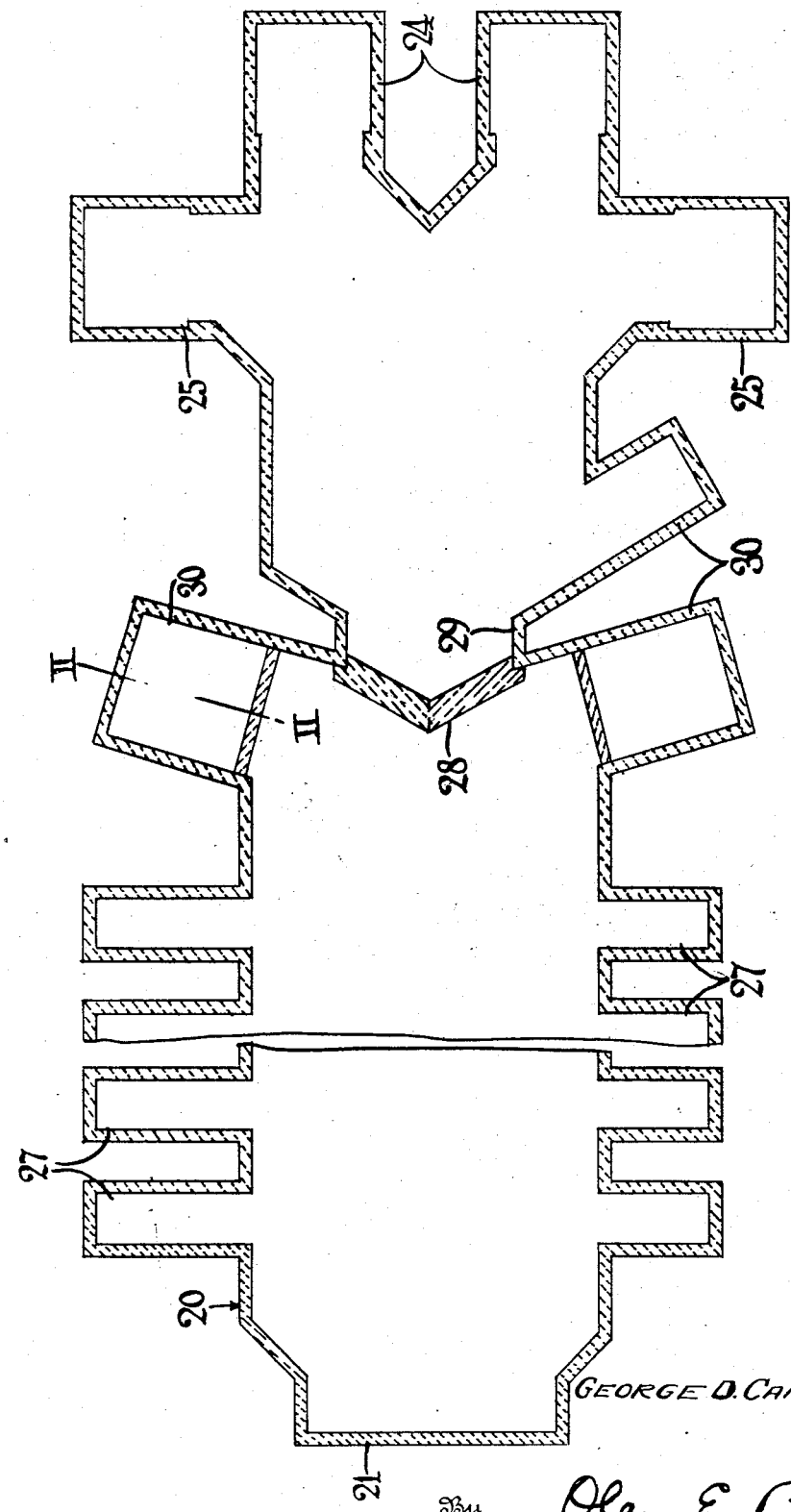

Sept. 4, 1945. G. D. CAMPBELL 2,384,073
APPARATUS FOR REFINING GLASS
Filed June 5, 1942 4 Sheets-Sheet 2
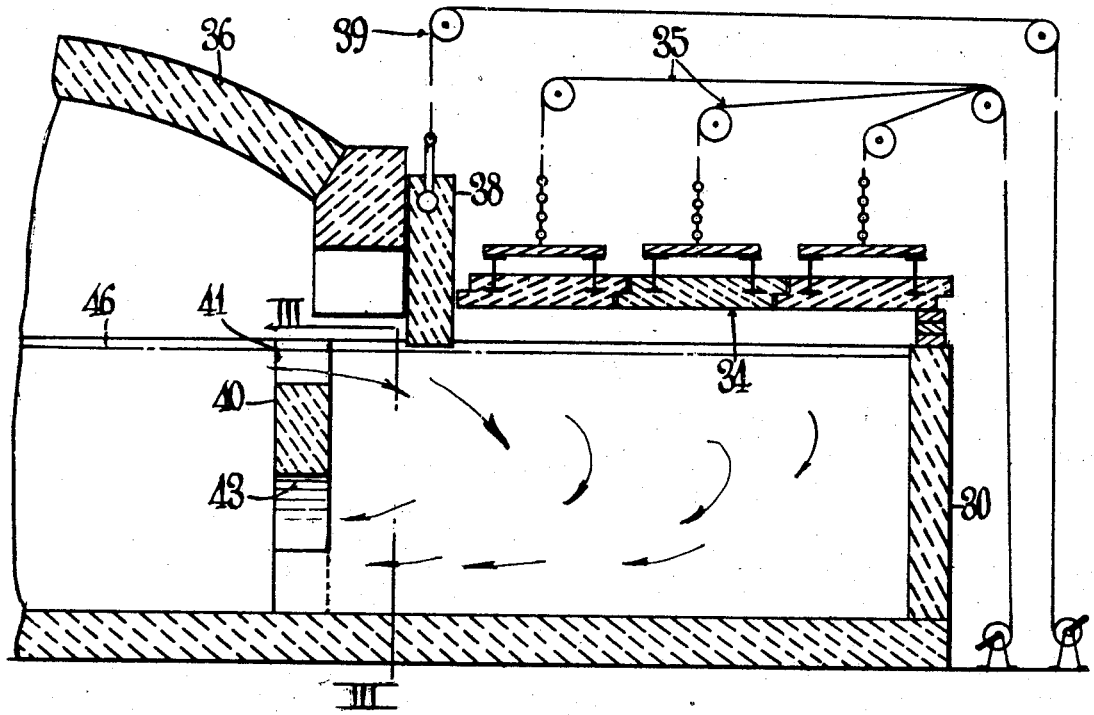
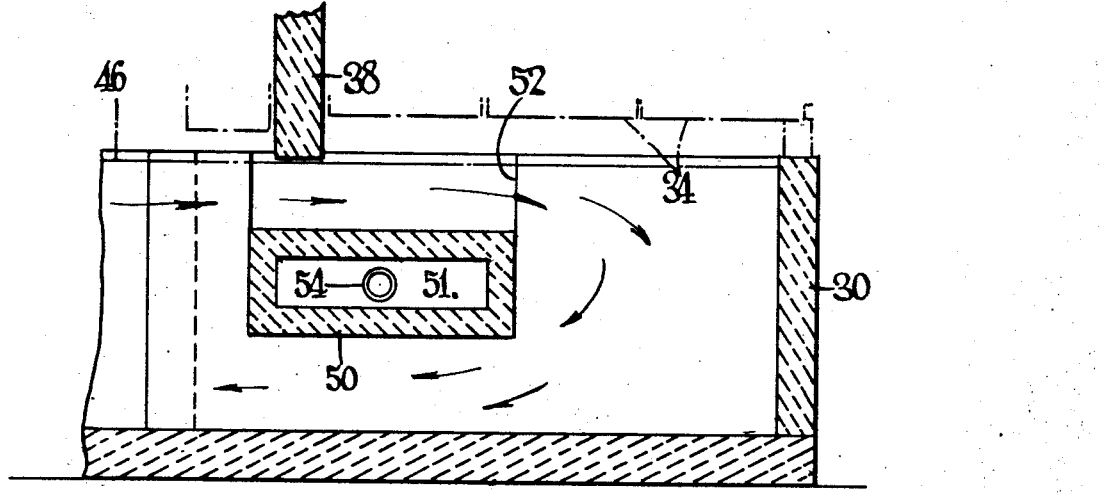
Inventor
GEORGE D. CAMPBELL
By Olen E. Bee
Attorney Sept. 4, 1945.　　　　G. D. CAMPBELL　　　　2,384,073
APPARATUS FOR REFINING GLASS
Filed June 5, 1942　　　　4 Sheets-Sheet 3
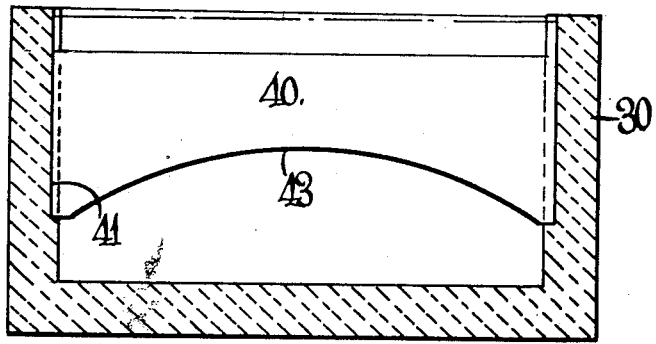
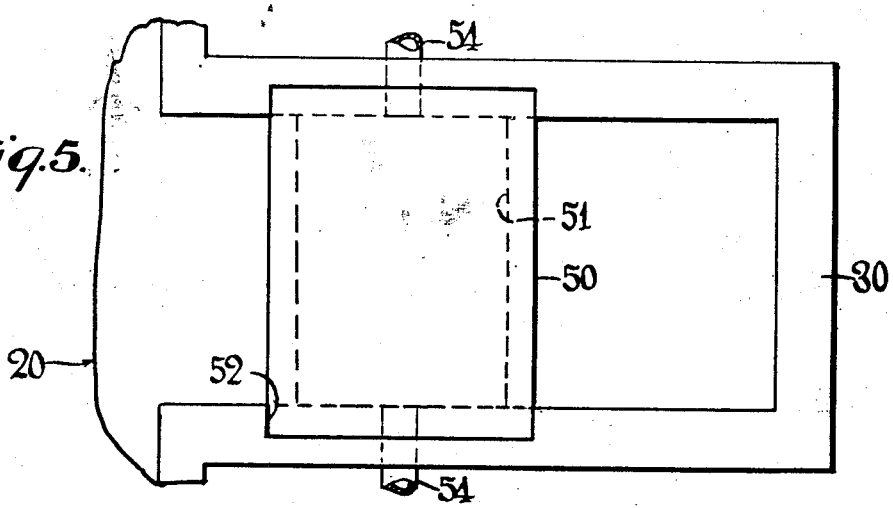
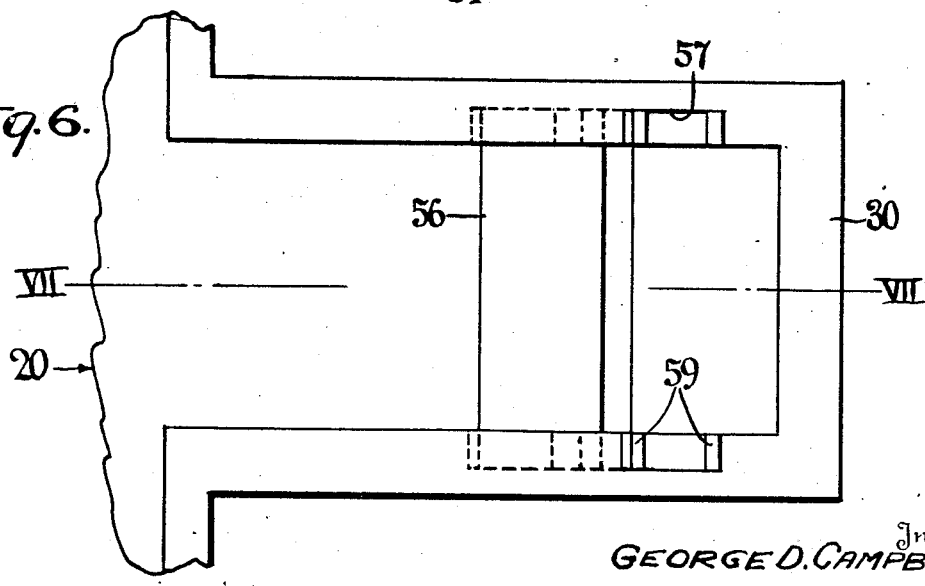
Inventor
GEORGE D. CAMPBELL
By Olen E. Bee
Attorney Sept. 4, 1945. G. D. CAMPBELL 2,384,073
APPARATUS FOR REFINING GLASS
Filed June 5, 1942 4 Sheets-Sheet 4

Inventor
GEORGE D. CAMPBELL
By Olen E Bee
Attorney

Patented Sept. 4, 1945

2,384,073

UNITED STATES PATENT OFFICE 2,384,073

APPARATUS FOR REFINING GLASS

George D. Campbell, Tarentum, Pa., assignor to Pittsburgh Plate Glass Company, Allegheny County, Pa., a corporation of Pennsylvania Application June 5, 1942, Serial No. 445,897

8 Claims. (Cl. 49—54)

This invention relates to the control of molten glass baths and it has particular relation to apparatus designed to aid in refining molten glass preparatory to withdrawing it from the bath.

One object of the invention is to provide a glass containing tank so constructed as to secure improved reaction of glass ingredients in a molten glass bath therein and to reduce the so-called seeds, blisters, ream, etc., which occur in poorer quality of glass.

Another object of the invention is to provide an improved tank for molten glass wherein the latter can be controlled as to its direction of movement.

Another object of the invention is to provide an improved skim kiln or compartment in connection with a tank for molten glass to divert impurities or unrefined glass ingredients from the location of withdrawal of the glass from the tank.

In the operation of a glass melting tank or furnace, particularly the type employed in connection with the drawing of window glass, it has been recognized that the better quality of glass passes down the central portion of the tank to the so-called central drawing chamber at the forward end of the tank. Certain types of tanks are so constructed that there are one or more drawing chambers at the front central extremity of the tank and at least one drawing chamber at each side of the chamber adjacent its front extremity. The glass drawn from the side chambers generally is not as good in quality as that drawn from the front chambers.

The basin of the tank which contains the molten glass bath is composed of refractory blocks and as the body of the bath moves toward the drawing end of the tank, the side walls thereof are at least slightly cooler than the inner portion of the bath. Impurities, such as incompletely reacted glass batch, products of erosion along the refractory walls, foam, etc., tend to collect and move toward and along the side walls of the tank. Since the tank walls are somewhat cooler than the body of the tank, there is retardation of reaction of the glass ingredients along this area. Solution from the tank basin walls may form in effect a protective shelf for the partially refined glass as it proceeds along the walls where it is shielded from full effect of the heat. Convection currents move from the center of the bath toward the walls, particularly in the upper strata of the bath where poorer quality is more pronounced. Convection currents also move vertically and angularly downward along the side walls as the cooler glass sinks and the warmer upper glass moves in to take its place. This glass contaminated with impurities including refractory solution, seeds at appreciable depth, etc., will become involved in eddy currents and will mix with the better quality of glass somewhat close to the walls. It is recognized that the lower portion of the molten glass bath moves in a reverse direction; that is, back toward the hotter body portion nearer the charging or rear end of the tank.

According to this invention, the characteristics discussed above of the molten glass bath in the tank are taken advantage of in designing tank walls and in adding elements in such manner as to improve the general quality of the glass in the side drawing chambers, as well as in the end drawing chambers, and more completely to control the action of the bath in its tendencies toward movement.

Figure 8:
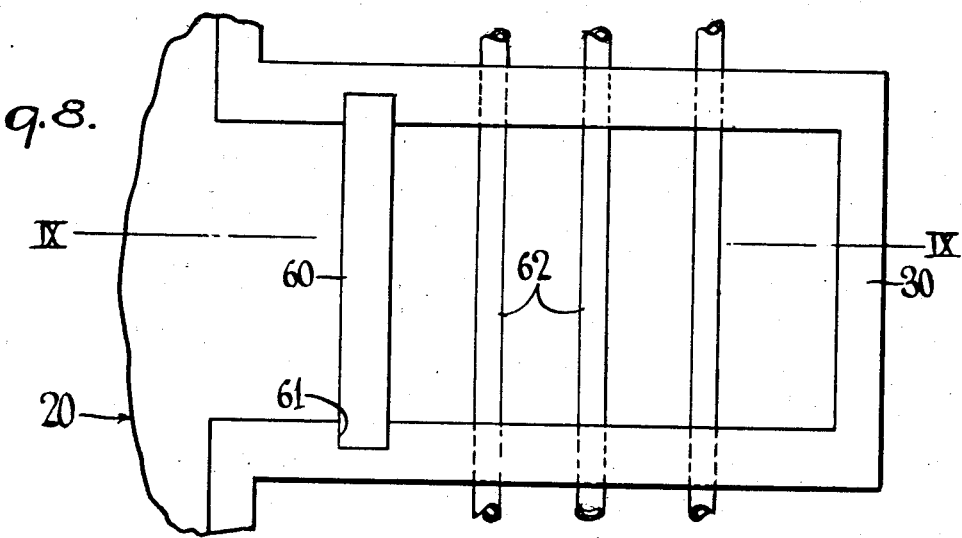
Figure 9:
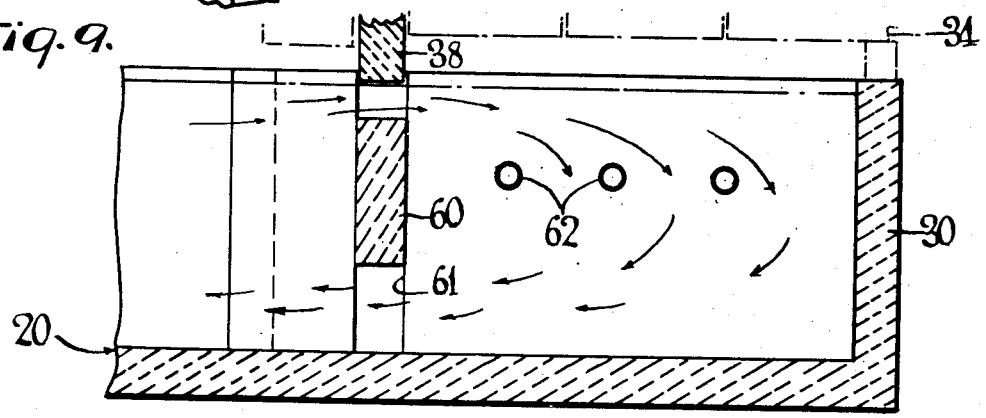

In the drawings:

Fig. 1 is a diagrammatic horizontal section of a glass melting tank or furnace; Fig. 2 is a fragmentary vertical section on a larger scale taken substantially along the line II—II of Fig. 1 with added tank roof structure; Fig. 3 is a fragmentary vertical section taken substantially along the line III—III of Fig. 2; Fig. 4 is a fragmentary vertical section similar to Fig. 2 illustrating another form of structure; Fig. 5 is a fragmentary plan of the structure shown in Fig. 4; Fig. 6 is a fragmentary plan similar to Fig. 5 of another arrangement of elements; Fig. 7 is a fragmentary vertical section taken substantially along the line VII—VII of Fig. 6; Fig. 8 is a fragmentary plan similar to Fig. 5 of another arrangement of elements; and Fig. 9 is a fragmentary cross section taken substantially along the line IX—IX of Fig. 8 with certain elements added.

In one form of the invention there is provided a glass melting tank 20 adapted to contain a molten glass bath which moves generally from a rear batch-charging end 21 toward a drawing end of the tank where front drawing chambers 24 and side drawing chambers 25 are formed. During the tank operation, the glass ingredients are melted and maintained in molten state by means of flames from suitable fuel fed through side ports 27 along the sides of the tank. In this type of apparatus, known as a regenerative tank, the flames are played over the surface of the bath alternately at proper intervals from opposite sides of the tank. Ordinarily tanks of this type are operated continuously over considerable periods of time.

Before entering the forward portion of the tank, the glass bath passes underneath the refractory floater 28 extending across a narrow channel or neck portion 29 of the tank and resting upon the surface of the bath. This floater which is formed of refractory material is designed to skim off and direct toward the tank sides surface impurities that may collect upon the bath. Skim kilns or compartments 30 on opposite sides of the tank are formed adjacent the location of the floater and may be arranged at an angle to the longitudinal walls of the tank; that is, the center line of each skim kiln is directed at an angle rearwardly toward the center line of the tank.

Suitable roof structure 34 (Fig. 2) can be adjusted to proper height over the skim kiln by means of conventional gearing 35 indicated diagrammatically in Fig. 2. Other tank roof structure 36 covers the body of the tank. A damper 38 is disposed across the kiln adjacent its mouth to control the amount of heat to be admitted thereto. The damper can be adjusted vertically by means of conventional gearing 39 shown diagrammatically in Fig. 2.

A bridge 40 of refractory in slab form traverses the skim kiln 30 in substantially horizontal direction and its opposite ends are mounted in guides 41 formed vertically in the opposite inner sides of the walls of each kiln. The lower side of the bridge is arched, as indicated at 43. Bridges of this general type can be constructed in various forms, as indicated in Figs. 3 to 9.

The bridge 40 is submerged a proper depth beneath the surface of the molten bath, the level of which is indicated at 46, and the lower bridge surface is spaced from the bottom of the tank. The bridge is located slightly inwardly beyond the location of the damper 38, approximately at the mouth of the kiln.

It is to be understood that the kiln is maintained at somewhat lower temperature than the body of the glass bath and that the hotter molten glass drifts toward the cooler mass in the kiln. Therefore, along the sides of the tank, the hotter glass which moves toward the entrance of the kiln is drawn into the latter over the top of the bridge. As it becomes cooler, the surface glass in the kiln sinks to such depth as to be able to pass beneath the bridge back to the body of the bath. Since there is movement of the lower body of the bath back toward the charging end, the impurities along the marginal portions of the bath are thus returned to the hotter portions of the tank for further refinement.

In Figs. 4 and 5, another form of bridge 50, which is built of refractory has a central chamber 51 and is mounted in vertical guides 52 in the walls of the kiln. If desired circulation of fluid, such as air, gas or water, in the chamber can be effected through conduits 54 connected thereto and extending through the kiln walls. In this arrangement the bridge is located outwardly farther toward the central portion of the kiln and with its edge approximately beneath the damper 38.

Another arrangement of bridge 56 is shown in Figs. 6 and 7 and is mounted in guides 57 sloping from the top of the kiln walls inwardly toward the bottom thereof. The walls of the guides converge downwardly. This bridge is in the form of a slab of refractory disposed horizontally across the kiln and it is tilted from its bottom edge rearwardly by virtue of its position in the sloping guides. The degree of tilting can be altered by applying wedges 59 in the guides to hold the bridge in the position desired. The incoming upper stratum of molten glass passes over the tilted bridge, as indicated by the arrows in Fig. 7. Then the surface or upper stratum of glass sinks and passes beneath the bridge back to the body of the bath in the tank as previously described.

Referring to Figs. 8 and 9, a bridge 60 in the form of a transverse slab of refractory is mounted in guides 61 below and in substantially the same vertical plane as the damper 38. The bridge is disposed in proper position beneath the glass surface and is spaced at such distance from the bottom of the kiln that the circulation of molten glass, as indicated by the arrows (Fig. 8), is insured. Further control of the temperature of the glass in the kiln can be secured by a circulation of temperature-varying fluid through conduits 62 traversing the kiln and projecting through opposite sides thereof at suitable depth in the mass of molten glass.

Although several arrangements of structure have been shown and described in detail, it will be apparent to those skilled in the art that the invention is not so limited, but that various changes can be made therein without departing from the spirit of the invention or from the scope of the appended claims.

I claim:

1. In a glass melting tank for containing a molten glass bath normally flowing through the tank at predetermined level, a skim kiln extending outwardly from one side of the tank in communication therewith, refractory means extending transversely of the skim kiln beneath the molten glass level therein and spaced from the bottom of the tank to receive portions of the molten bath flowing ino the kiln above the refractory means and out of the kiln below the refractory means.

2. In a glass melting tank for containing a molten glass bath at a predetermined level, said tank having a batch-receiving end and a glass drawing end and wherein the molten glass is movable toward the glass drawing end, said tank having a compartment offset laterally from the tank side, and means disposed below the bath level above the bottom of the tank to facilitate the passage of a portion of the molten glass bath adjacent said tank side into the compartment and downwardly back under said means into the body of the tank.

3. In a glass melting tank for containing a molten glass bath at predetermined level, a skim kiln at one side of the tank forming a part thereof for containing a part of the molten bath, a refractory bridge traversing the kiln at a location between the bottom of the kiln and the level of the bath to permit the passage of molten glass above and beneath said bridge, and means for adjusting the bridge to different heights in the walls of the kiln.

4. In a glass melting tank for containing a molten glass bath at predetermined level, a skim kiln at one side of the tank forming a part thereof for containing a part of the molten bath, a refractory bridge traversing the kiln at a location between the bottom of the kiln and the level of the bath to permit the passage of molten glass above and beneath said bridge, said bridge being in the form of a slab and mounted in tilted relation in the walls of the kiln.

5. In a glass melting tank for containing a molten glass bath at predetermined level and having longitudinal side walls, an offset basin portion projecting laterally from one of the side walls and communicating with the body of the tank, a bridge traversing the basin portion between the bottom thereof and the molten glass level, and conduits in communication from opposite sides with the basin portion through the walls thereof for circulation of fluid therethrough.

6. In a glass melting tank for containing a molten glass bath at predetermined level and having longitudinal side walls, a skim kiln at one side of the tank forming a part thereof for containing a part of the bath, a refractory slab traversing the kiln at a location between the bottom of the kiln and the level of the bath to permit passage of molten glass above and beneath said bridge, and guides formed in the walls of the kiln sloping downwardly from the upper portion of the kiln walls and inwardly toward the body of the tank, said guides supporting the slab in sloping relation.

7. In a glass melting tank containing a molten glass bath at predetermined level and having longitudinal side walls extending from rear to front of the tank and between which molten glass is adapted to flow forwardly, and compartments on opposite sides of the tank having vertical side walls disposed at acute angles to the side walls of the tank and opening rearwardly at such acute angles in communication with the body of the tank to divert marginal portion of the molten glass bath into said compartments.

8. In a glass melting tank containing a molten glass bath at predetermined level and having longitudinal side walls extending from rear to front of the tank and between which molten glass is adapted to flow forwardly, compartments on opposite sides of the tank including front and rear walls disposed at acute angles to the sides of the tank and opening rearwardly at such acute angles in communication with the body of the tank to divert marginal portions of the glass bath into said compartments, said compartments having a front wall extension projecting farther out into the body of the bath than the rear wall.

GEORGE D. CAMPBELL.